(12) United States Patent
Ramanathan et al.

(10) Patent No.: US 8,897,426 B2
(45) Date of Patent: Nov. 25, 2014

(54) USER INTERFACE ARCHITECTURE AND PROTOCOL FOR RICH CLIENT CONTROLLED VOICEMAIL

(75) Inventors: Rajesh Ramanathan, Redmond, WA (US); Eran Shtiegman, Redmond, WA (US); Paul Tidwell, Sammamish, WA (US); Robert Osborne, Redmond, WA (US); Justin Michael Maguire, III, Andover, MA (US)

(73) Assignee: Microsoft Corporation, Redmond, WA (US)

( * ) Notice: Subject to any disclaimer, the term of this patent is extended or adjusted under 35 U.S.C. 154(b) by 2177 days.

(21) Appl. No.: 11/759,734

(22) Filed: Jun. 7, 2007

(65) Prior Publication Data
US 2008/0304635 A1 Dec. 11, 2008

(51) Int. Cl.
*H04M 1/64* (2006.01)
*H04M 3/533* (2006.01)
*H04M 11/10* (2006.01)

(52) U.S. Cl.
CPC .................................. *H04M 3/533* (2013.01)
USPC ....................... 379/88.17; 455/413

(58) Field of Classification Search
CPC .............. H04M 1/575; H04M 1/7255; H04M 2203/551; H04M 2250/60; H04M 3/48; H04M 3/537
USPC ......... 379/74, 88.23, 88.27, 201.01; 455/412.1, 414.1
See application file for complete search history.

(56) References Cited

U.S. PATENT DOCUMENTS

| | | | |
|---|---|---|---|
| 6,282,270 B1 | 8/2001 | Porter | |
| 6,704,394 B1 * | 3/2004 | Kambhatla et al. | 379/67.1 |
| 6,751,299 B1 | 6/2004 | Brown et al. | |
| 7,113,767 B2 | 9/2006 | Vaananen | |
| 7,120,140 B1 | 10/2006 | Dylag et al. | |
| 7,162,027 B1 * | 1/2007 | Cannon et al. | 379/382 |
| 2003/0064711 A1 | 4/2003 | Gilbert et al. | |
| 2003/0215080 A1 | 11/2003 | Wengrovitz | |
| 2004/0266399 A1 * | 12/2004 | Simpson | 455/412.1 |
| 2005/0278436 A1 | 12/2005 | Sharma et al. | |
| 2006/0003745 A1 | 1/2006 | Gogic | |
| 2006/0031326 A1 * | 2/2006 | Ovenden | 709/206 |
| 2006/0072715 A1 * | 4/2006 | Michael et al. | 379/88.12 |
| 2006/0072726 A1 | 4/2006 | Klein et al. | |
| 2006/0083358 A1 | 4/2006 | Fong et al. | |
| 2006/0239419 A1 | 10/2006 | Joseph et al. | |

(Continued)

OTHER PUBLICATIONS

Richard Costello. Shoreline Voice Communications System. Nov. 2, 2001. http://www.performancetel.com/literature/shoretel/gartnergoupreview.pdf.

(Continued)

*Primary Examiner* — Fan Tsang
*Assistant Examiner* — Solomon Bezuayehu
(74) *Attorney, Agent, or Firm* — Andrew Smith; Jim Ross; Micky Minhas

(57) ABSTRACT

Systems and methods that control a voice mail experience from a client side of a voice mail server system and enhance features thereof. A dynamic voice mail user interface can change based on what predetermined activity the user engages in. Moreover, a field component further enables a caller to identify characteristics of the voice mail. An XML based protocol empowers a client application to control state of the voice mail system, wherein a session Initiation Protocol (SIP) INFO request or response can carry out voicemail control command, result and event.

20 Claims, 10 Drawing Sheets

(56) References Cited

U.S. PATENT DOCUMENTS

| | | | |
|---|---|---|---|
| 2006/0245556 A1* | 11/2006 | Gatzke et al. | 379/88.16 |
| 2006/0245558 A1 | 11/2006 | Gatzke et al. | |
| 2007/0140441 A1* | 6/2007 | Dunsmuir | 379/80 |
| 2007/0280435 A1* | 12/2007 | Smith | 379/67.1 |
| 2007/0280458 A1* | 12/2007 | Aberethy et al. | 379/201.01 |
| 2007/0286399 A1* | 12/2007 | Ramamoorthy et al. | 379/355.02 |
| 2008/0260118 A1* | 10/2008 | Lyle | 379/88.23 |
| 2010/0279662 A1* | 11/2010 | Kuusinen et al. | 455/412.2 |

OTHER PUBLICATIONS

VoiceMail Master for TVS200 1.05. http://voicemail-master-for-tvs200.dmitry-nikiforov.qarchive.org/. Last accessed Nov. 16, 2006.

Cisco Systems, Inc. Cisco CallManager System Guide. http://www.cisco.com/application/pdf/en/us/guest/products/ps561/c2001/ccmigration_09186a00800c4ca2.pdf. Last accessed on Nov. 16, 2006.

* cited by examiner

USER INTERFACE ARCHITECTURE AND PROTOCOL FOR RICH CLIENT CONTROLLED VOICEMAIL

BACKGROUND

Advanced technology computer and communication systems have transformed many important aspects of human and computer interactions. For example, voice answering machines provide a convenient manner for a person to electronically capture a message and forward it to another. With technology advancements such as wireless and Internet systems, electronic messaging systems have become much more sophisticated. Such systems can include e-mail, voice mail, pager and cell phone technologies, for example, wherein information can be readily sent and retrieved in a concurrent manner.

Typically, voice messaging systems are frequently controlled by calling the voice messaging system, entering a password, and then selecting from various options. For example, password entry and option selection is normally achieved using Dual-tone multi-frequency (DTMF) tones generated in response to pressing keys on a telephone keypad. Support for DTMF control allows messages to be retrieved or deleted from a remote location via a telephone call to the voice messaging system.

Moreover, voice message systems often provide users an opportunity to record a message, which will be played to a calling party when the messaging system responds to a call. Recording of prompt messages can normally be performed locally at the answering system or remotely via a telephone call placed to the answering system. The prompt message which is presented to a calling party by a voice messaging system is often used to notify a calling party about when and how long the called party will be away from the called location and/or when the called party will be checking for recorded messages.

For such information to be useful, the prompt message must be updated to reflect changes in a user's schedule, planed absences from the office and/or other information. In many systems, to change a prompt message, a user of the system must record a new message. The process of recording messages, combined with the time associated with accessing a voice mail system to update a prompt message, discourages many users from updating and/or changing their prompt messages on a timely basis.

In addition, users of voice message systems can forget to update their prompt messages to reflect planned trips, the fact that they returned from a trip, or other circumstances that render an existing prompt message inappropriate or out of date. Occasionally, failure to keep a prompt message current is the result of an unintentional oversight. In other cases, the answering machine user finds it too inconvenient to contact one or more answering systems and update the prompt messages stored therein in a timely manner.

Moreover, computer based telephony applications are increasingly being developed in the Voice over Internet Protocol (VOIP) that provide the ability to make telephone calls, connect to a voicemail system and leave voice messages. In general, such applications are not user friendly, and do not utilize full potential of signaling/sending rich messages in various different forms to the voicemail server.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation enables control of voice mail experience from a client side of a voice mail server system, while enhancing features of the voice mail systems and telephonic applications, by employing a dynamic voice mail user interface. Such dynamic voice mail user interface can change based on what predetermined activity the user engages in (e.g., recoding a message, changing greeting, attaching a document to voice message, integrating other applications therewith, defining importance of the voice mail, and the like.)

In a related aspect, the dynamic voice mail user interface can include a field component that enables a caller to identify characteristics of the voice mail (e.g., importance, subject of voice mail, privacy levels and the like) to its intended receiver at destination. Moreover, an authorization component associated with the voice mail system and the dynamic voice mail user interface can apply permissions to allow some users to leave voice messages and further block other users from reaching the voicemail system. Furthermore, a control component enables clients to connect to the voice messaging system directly to deposit Voice-message for others directly and bypassing through related greetings. In a related aspect a sate component can determine a user's availability (e.g., out of office) and/or type of activity the user is engaged therein (e.g., user on another line, user interacting with a predetermined applications such as a word processing). Such state component can then interact with the dynamic voice mail user interface, to dynamically control the voicemail based on the user activity/presence level. Accordingly, predetermined features of the voice mail systems and telephonic applications (e.g., customized greetings based on user activity) can be presented to the caller.

According to a related methodology an XML based protocol controls the state of the voicemail system, and empowers a client application for such control. Such methodology can employ a Session Initiation Protocol (SIP) INFO request or response to carry out voicemail control command, result and event. Applications typically check responses to INFO requests, (wherein such requests carry voicemail control primitives) to verify if the response also carries control primitives. Also, the client and voice mail server are able to discover each other's capabilities and fall back to using Dualtone multi-frequency (DTMF), if they do not support the voicemail protocol of the subject innovation.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
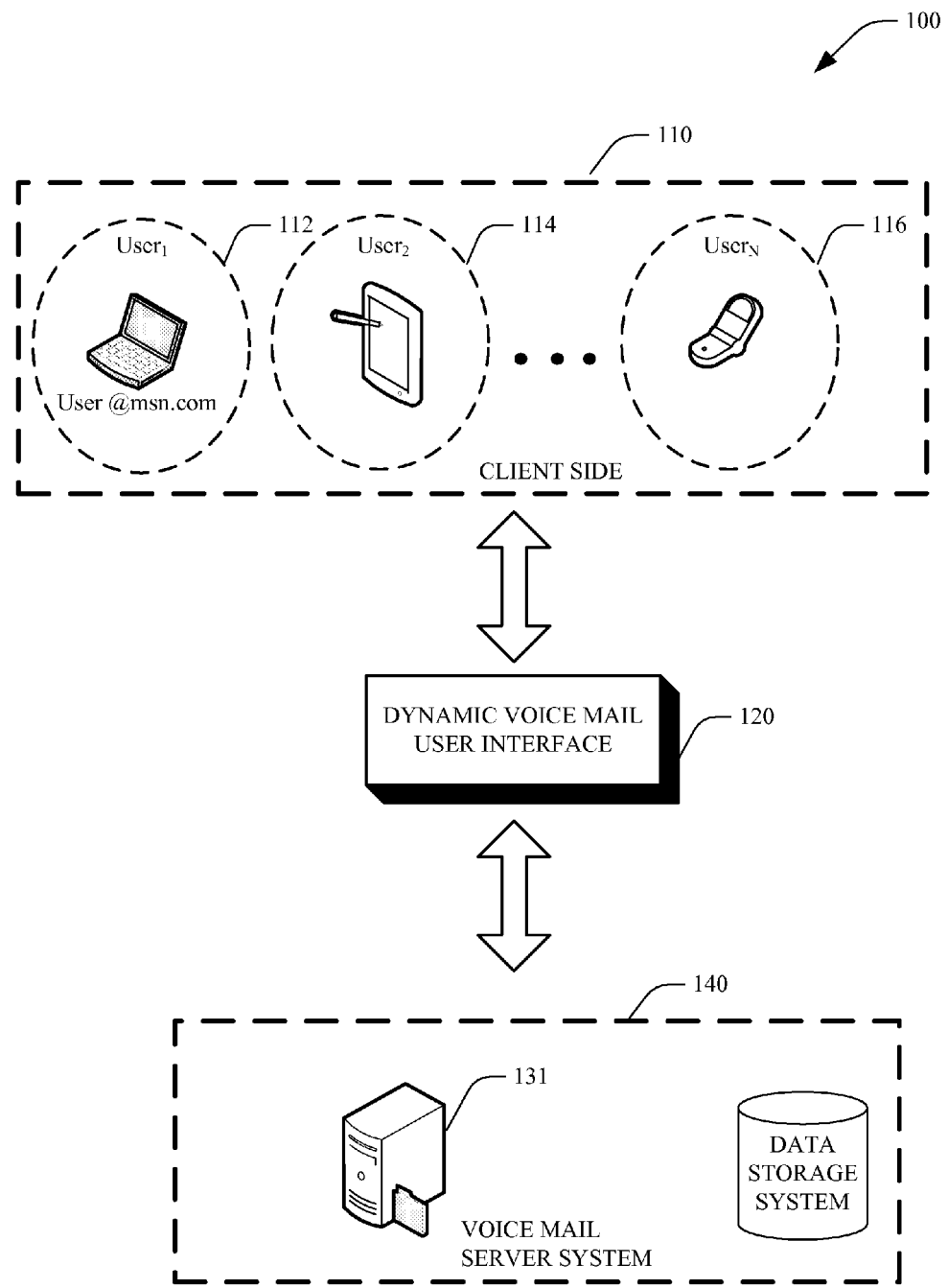
FIG. 1 illustrates a block diagram of an exemplary system with a dynamic voice mail user interface in accordance with an aspect of the subject innovation.

FIG. 1 illustrates a system 100 that enables controlling a voice mail experience from a client side 110 of a voice mail server system 140, and further enhances features of such voice mail systems and telephonic applications by employing a dynamic voice mail user interface 120. The dynamic voice mail user interface can change (e.g., automatically) based on a predetermined activity the user engages in. For example, when the user 112, 114, 116 initiates a call that is routed through the voice mail server system 130, and reaches a destination greeting, the dynamic voice mail user interface 120 can allow such users to integrate other applications therewith such as attaching a document thereto.

As illustrated in FIG. 1, the client side 110 can include a plurality of users 112, 114, 116 (1 thru N, where N is an integer). The users 112, 114, 116 can also be part of a network (e.g., wireless network) such as a system area network or other type of network, and can include several hosts, (not shown), which can be personal computers, servers or other types of computers. Such hosts generally can be capable of running or executing one or more application-level (or user-level) programs, as well as initiating an I/O request (e.g., I/O reads or writes). In addition, the network can be, for example, an Ethernet LAN, a token ring LAN, or other LAN, or a Wide Area Network (WAN). Moreover, such network can also include hardwired and/or optical and/or wireless connection paths.

The dynamic voice mail user interface 120 can change based on what predetermined activity the user engages in (e.g., recoding a message, changing greeting, attaching a document to voice message, integrating other applications therewith, defining importance of the voice mail, and the like.) The connections can be shared among the users 112, 114, 116 that can employ, personal computers, workstations, televisions, telephones, and the like for example. Moreover, the networks can further include one or more input/output units (I/O units), wherein such I/O units can includes one or more I/O controllers connected thereto, and each of the I/O can be any of several types of I/O devices, such as storage devices (e.g., a hard disk drive, tape drive) or other I/O device. The hosts and I/O units and their attached I/O controllers and devices can be organized into groups such as clusters, with each cluster including one or more hosts and typically one or more I/O units (each I/O unit including one or more I/O controllers). The hosts and I/O units can be interconnected via a collection of routers, switches and communication links (such as wires, connectors, cables, and the like) that connects a set of nodes (e.g., connects a set of hosts and I/O units) of one or more clusters. It is to be appreciated that the wireless communication network can be cellular or WLAN communication network; such as Global System for Mobile communication (GSM) networks, Universal Mobile Telecommunication System (UMTS) networks, and wireless Internet Protocol (IP) networks such as Voice over Internet Protocol (VoIP) and IP Data networks For example, the portable device employed by users can be a hand-held wireless communication device that can communicate with a wireless communication network, (e.g. wireless communication network) to upload and download digital information, via a cellular access point and/or via a wireless access network (WLAN) access point, such as a cellular base station, mobile switching center, 802.11x router, 802.16x router and the like. Further examples of the portable user devices can include a cellular communication device, a multi-mode cellular device, a multi-mode cellular telephone, a dual-mode cellular device, a dual-mode cellular/WiFi telephone, or like cellular and/or combination cellular/fixed internet protocol (IP) access devices.

Figure 2:
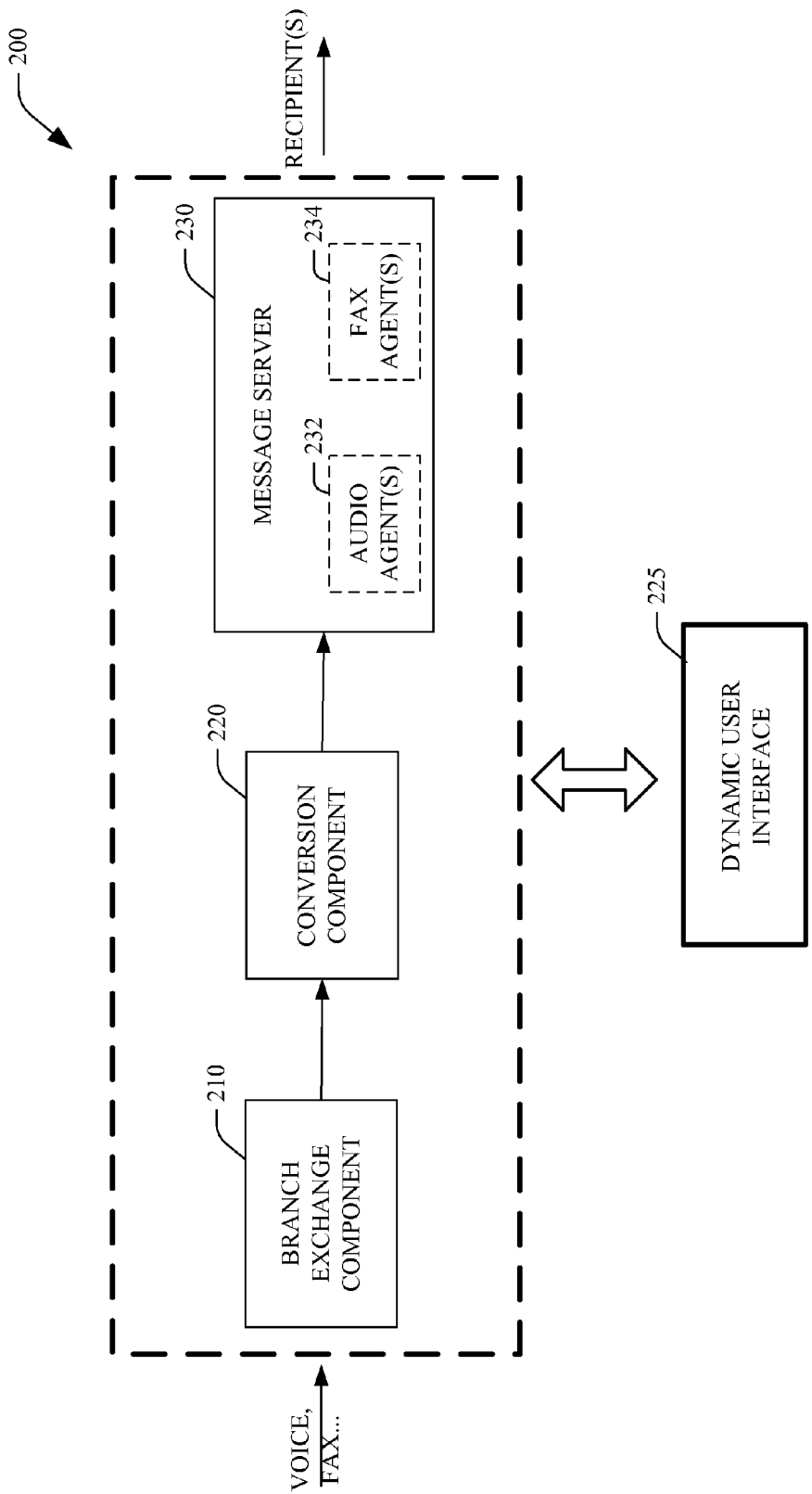
FIG. 2 illustrates a further exemplary aspect of a message system that interacts with a dynamic voice mail user interface with a field component according to a particular aspect of the subject innovation.

FIG. 2 illustrates an exemplary message system 200 with a dynamic voice mail user interface 225 in accordance with an aspect of the subject innovation. The system 200 includes a branch exchange component 210 that acquires voice communications, and can include an Intranet protocol (IP) branch exchange (IPBX). Furthermore, the branch exchange component 210 can be public (e.g., central office exchange service) or private (PBX). Accordingly, the branch exchange component 210 can receive communications from conventional telephone systems or over the Internet, among others, via a telephone protocol, IP protocol (e.g., H.323, SIP . . . ) or any other public or proprietary protocol. Upon receipt of a communication the branch exchange component 210 can route the communication to the conversion component 220. For example, the branch exchange component 210 can forward a call that was not answered or a phone number configured to answer a fax to the conversion component 220. The conversion component 220 can receive a communication from the branch exchange component 210 (or via a connection provided thereby), and such conversion component 220 can convert the received communication to an email. For example, the communications can subsequently or concurrently be transformed into an SMTP (Simple Mail Transfer Protocol) message. As illustrated, the system 200 can further employ the dynamic voice mail user interface 225, which changes (e.g., automatically) based on a predetermined activity the user engages in.

In a related aspect, the system 200 can incorporate e-mail capabilities, wherein a voice or facsimile message can be recorded or saved and provided as an attachment. Furthermore, a portion of the content of the message can be encoded in the body, for instance in a MIME (Multipurpose Internet Mail Extension) format. Additional information can also be captured in the body such as message type (e.g. voice, fax), calling telephone number, voice message duration, voice message sender name, attachment name, fax number of pages and the like. Moreover, the MIME message can subsequently be converted into an internal representation, which can be stored with an internal representation of a message classification. This classification can further be employed by the dynamic voice mail user interface component 215 to display an optimized UI.

In a related aspect, the conversion component 220 can also be extensible, to employ third party and/or non-native functionality, for instance provided by plug-in components (not shown). For example, such plug-in component can provide algorithms to facilitate translating speech-to-text or for optical character recognition, and hence not all functionality need to be provided solely by the conversion component 220. Accordingly, the conversion component 220 can be updated such that it can employ the best techniques or mechanisms associated with email generation, for example.

Also, a generated email or SMTP message can be transmitted from the conversion component 220 to a message server 230. The message server 230 can process messages for delivery to an intended recipient mailbox(es), among other things, such that they can be received or retrieved by an email application (e.g., viewer/editor and POP or IMAP client). For example, the server 230 can correspond to a mailbox, SMTP and/or a bridgehead server. It should also be appreciated that the conversion component 220 can be an SMTP client that communicates with the SMTP server. In addition to forwarding messages to a recipient's mailbox or mailboxes, the message server 230 can filter such messages.

The message server 230 can employ audio agents 232 to scan the audio rather than the text preview of the message. Such audio agents 232 can evaluate based on tone of voice, volume, and/or obscenity checking, among other things. Similarly, fax agents 234 can scan the structure of the email separate from the converted structured document or preview. It should also be noted that these agents 232 and 234 can be plug-ins or add-ons produced by the server vendor or third-party vendors, among others. As explained earlier, the dynamic voice mail user interface 225 can change based on what predetermined activity the user engages in (e.g., attaching a document to voice message, integrating other applications therewith, defining importance of the voice mail, and the like.) It is to be appreciated that the system 200 is an exemplary system that can employ the dynamic voicemail user interface of the subject innovation, and other communication systems are well within the realm of the subject innovation.

Figure 3:
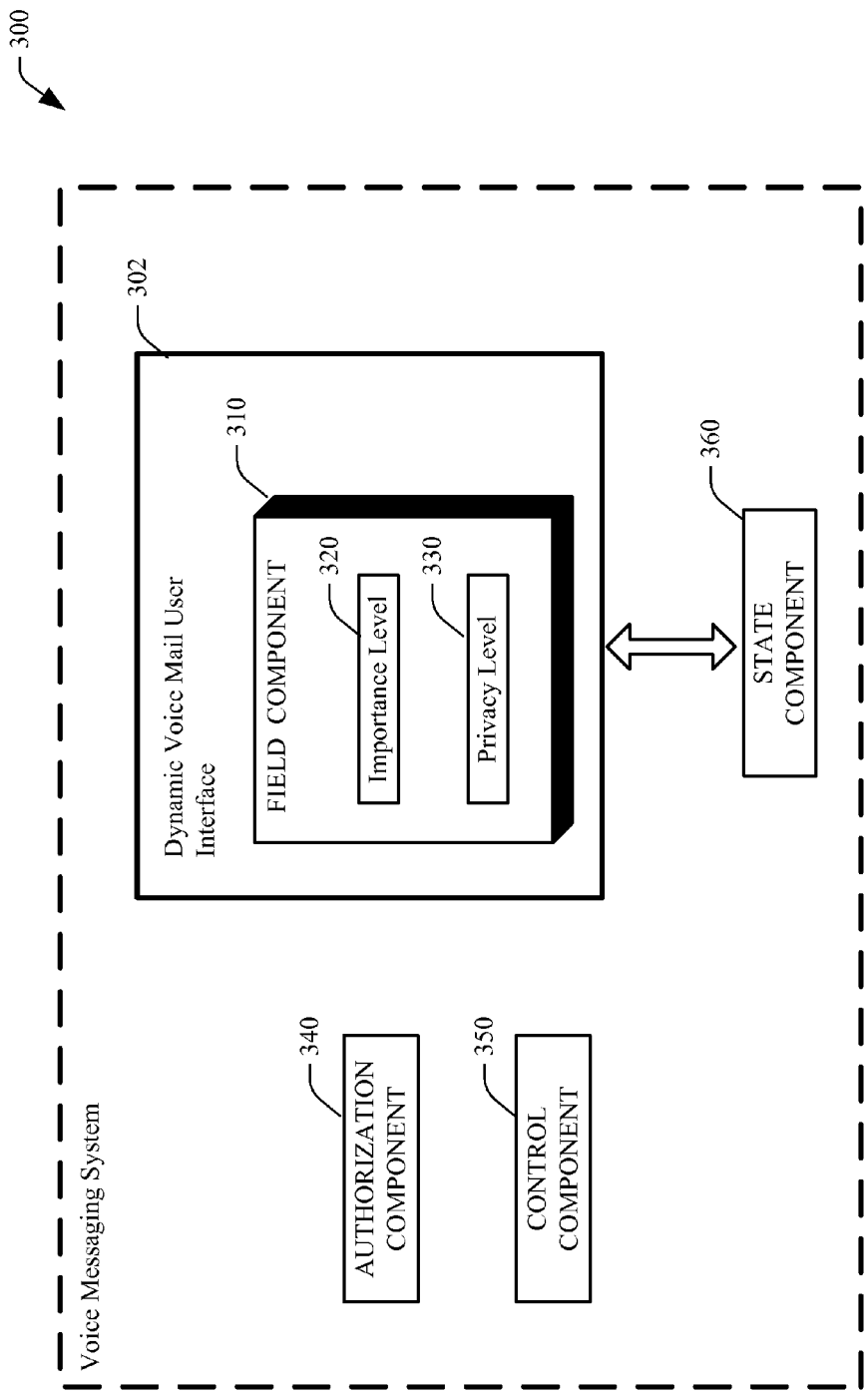
FIG. 3 illustrates a particular block diagram of a dynamic voice mail user interface that includes a field component, as part of an exemplary voice mail system of the subject innovation.

FIG. 3 illustrates a particular block diagram of a dynamic voice mail user interface 302 that includes a field component 310, as part of a voice mail system 300 in accordance with an aspect of the subject innovation. Such field component 310 enables a caller to identify typical characteristics of the voice mail for the intended recipient. For example, the field component 310 enables designation for the importance level 320 of the voice mail. Moreover, the field component 310 enables the caller to set a privacy level 330 for its intended receiver at destination (e.g., access restriction for agents of the intended receiver.) Accordingly, the dynamic voice mail user interface 300 enables a control of voice mail experience from a client side of a voice mail server system and enhances features of such voice mail systems and telephonic applications.

As illustrated in FIG. 3, an authorization component 340 associated with the voice mail system and the dynamic voice mail user interface 302 can apply permissions to allow some users to leave voice messages and further block other users from reaching the voicemail system. Furthermore, a control component 350 enables clients to connect to the voice messaging system directly to deposit Voice-message for others directly and bypassing through related greetings. Moreover, the state component 360 can determine a user's availability (e.g., out of office) and/or activity the user is engaged therein (e.g., user on another line, user interacting with a predetermined applications such as a word processing). For example, the state component 360 can then interact with the dynamic voice mail user interface 302, to dynamically control the voice messaging system 300 based on the user activity/presence level. Accordingly, predetermined features of the voice mail system and telephonic application (e.g., customized greetings) can be presented to the caller.

Figure 4:
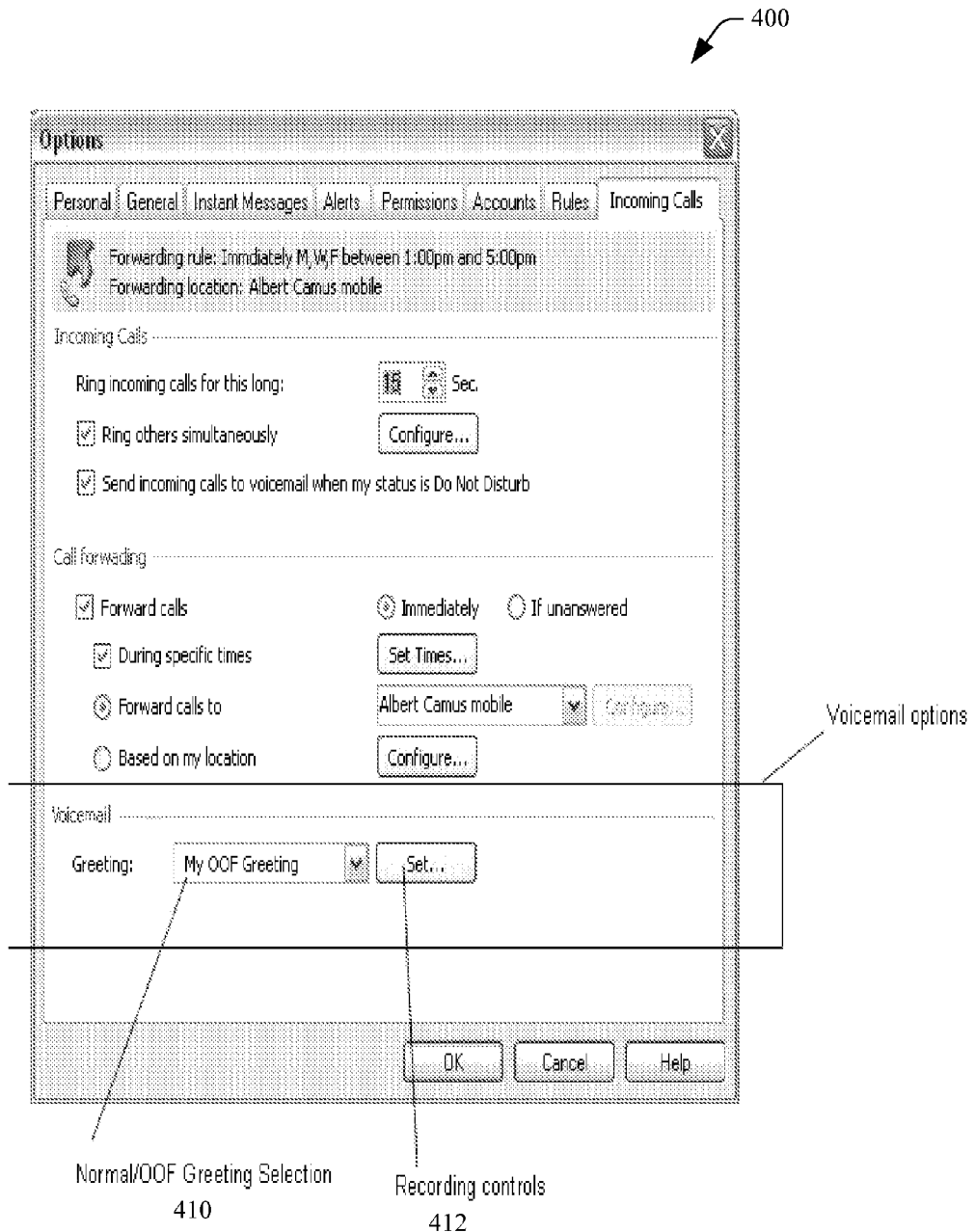
FIG. 4 illustrates an exemplary voice mail user interface that enables greeting selection in accordance with an aspect of the subject innovation.

FIG. 4 illustrates a particular dynamic voice mail user interface 400 in accordance with an aspect of the subject innovation. The interface component 400 enables users to change voicemails settings from the options dialog provided. As illustrated in FIG. 4, internal or external Out of Office greetings (OOF) can be set, and greeting messages can be managed (e.g., stop/record/replay/delete.) For example, the voice mail greetings selection 410 enables users to select the current greeting that is active, and such setting can further be roamed to other clients. Moreover, the recording control 412 allow the user to record, import or export greetings, and the voice mail greeting can also be shared with other users. The out of office greeting can beautomatically set when a user's presence state is changed to out of office. Hence, user presence can be tied to features of the voicemail, for example.

Figure 5:
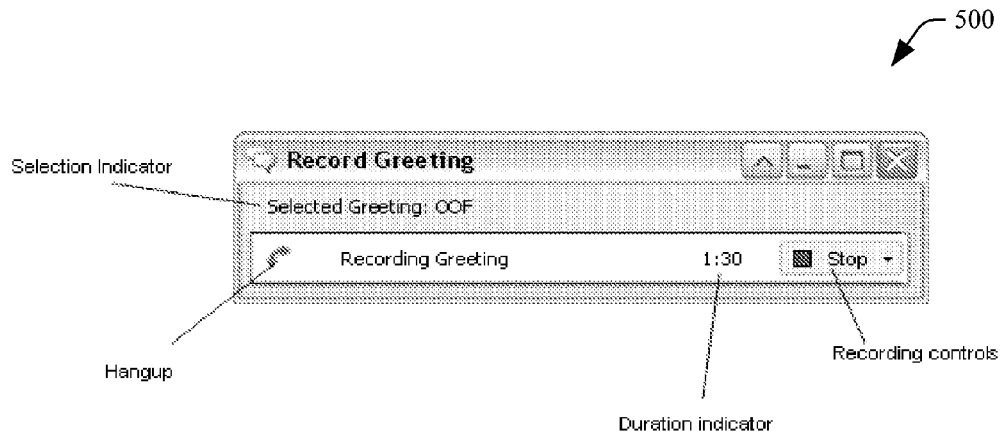
FIGS. 5-7 illustrate particular user interface features, as part of the dynamic voice mail user interface of the subject innovation.
Figure 6:
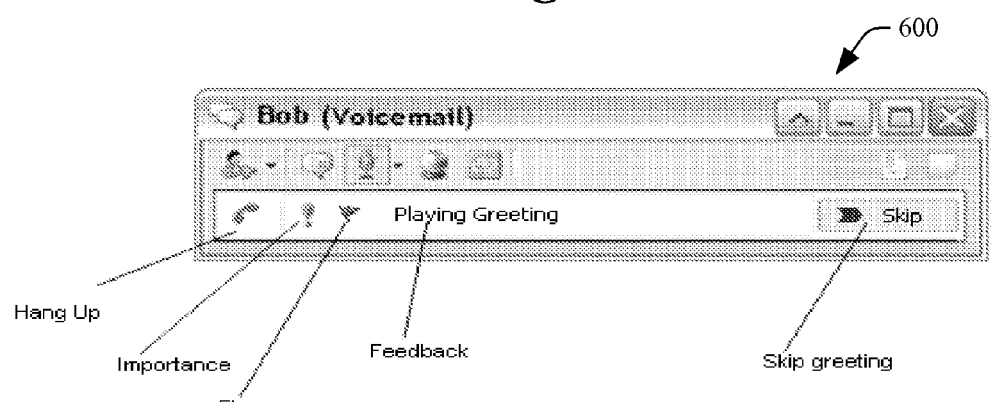
Figure 7:
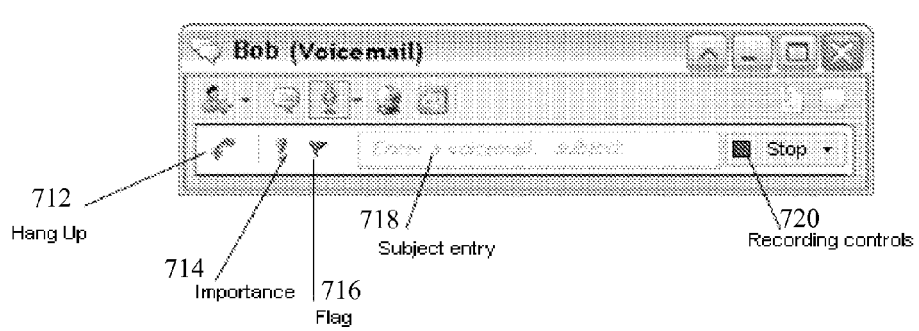

FIGS. 5-7 illustrate related user interface features as part of the dynamic voice mail user interface of the subject innovation. The record greeting UI 500 enables functions such as record and save greeting, hear playback and delete greeting. The controls can allow for skipping initial controls, setting the subject of the voice mail, the importance and the like. Moreover, voice controls can change (e.g., appearance, state, and the like) depending on when hang up occurs, whether initial greeting has been skipped or timed out, whether replay features have been triggered and the like. For example, FIG. 6 illustrates a change scenario for when the user hears the remote user's greeting message, then the voice controls can change to display 600, and the user can select to skip the greeting and proceed to recording. Moreover, at such point the user can select to hang up or set importance level and hang up, wherein hanging up before recording the message can generate a missed call notification. Alternatively, if the user does not select "skip", then the entire greeting is played and the recording is started automatically, wherein the dynamic voice mail user interface automatically changes to user interface 700. As illustrated in FIG. 7, the hang up button 712 hangs up the call such that if the user was recording a voice message, the system sends out a Save INFO and follows up with a BYE. Likewise, if the user had suspended recording, and had selected STOP, then the system will send out a Save INFO followed with a BYE. Similarly, if the user had deleted the voice message then just a BYE is sent out, wherein the server does not submit a voice message and submits a missed call instead.

Moreover, the importance button 714 sets the importance of the voice message. In one aspect, when the user selects the importance button 714 while recording, then an INFO message is sent out marking the voicemail as important. Likewise, if the importance button 714 is selected before starting a recording, then the INFO message is sent along with the start recording command. Similarly, the importance button can reflect the importance of an associated email message. Furthermore, the flag button 716 flags the voice message for follow up, and can appear on the to do list in an scheduling application of the recipient. The subject entry field 718 can be employed to enter a subject for the call any time during the conversation.

For example, the system can send out an INFO message containing the subject entry field 718 in during a recording session (the system can wait for an inter-character gap of 2 seconds (e.g., use of commands in XML inside the INFO)—before sending out the subject to the server.) Likewise, if the recording is stopped, then the subject is sent out when the user selects start again. The subject entry field 718 can also reflect the subject of the call in an associated email item.

The recording control 720 can show various options in a drop down and highlights the main action in a particular mode (e.g., when recording: STOP is the main action; when stopped: RECORD is the main action.) Moreover, other sub actions can include: DELETE, REPLAY, wherein when replaying: STOP is the main action. Moreover, selecting DELETE can place such button in the RECORD mode, wherein the prompt "This will erase previous recording. Are you sure?" is displayed to the user. In a related aspect notifications can also be displayed to a user for number of Unread Missed call, and number of unread voicemails.

An exemplary command protocol in accordance with an aspect of the subject innovation can include;

| Syntax |
| --- |
| Command without parameters: <br> <command name="cmdname" id="yyy"/> <br> Command with parameters |

| Syntax |
| --- |
| <command name=" cmdname" id="yyy"> <br>   <param name="paramname" value="xxxx"/> <br>   <param name="paramname" value="xxxx"/> <br>   <param name="paramname" value="xxxx"/> <br>   <param name="paramname" value="xxxx"/> <br> </command> <br> <result name="cmdname" id="yyy" result="success/failure"/> |

An event can be defined that is used for the voicemail sever to report state changes;

| |
| --- |
| <event name="StateChanged"> <br>   <param name="state" value="xxxx"/> <br> </event> |

Both <result> and <event> can have parameters using the same syntax as command. The "id" attribute of <result> corresponds to the "id" attribute of the command it is reporting. The command sender can make these id's unique if correlation is desired. It is to be appreciated that not all commands necessarily have results. Some may report a result only when there is a failure. Many commands result in a state transition for the voice mail server, wherein such new state can be reported using an event.

An event can be defined that is used for the voicemail sever to report state changes, such as;

| |
| --- |
| <event name="StateChanged"> <br>   <param name="state" value="xxxx"/> <br> </event> |

The following table 1 indicates exemplary command that can be employed in conjunction with the subject innovation.

TABLE 1

| Command | | Parameters | Result | Notes |
| --- | --- | --- | --- | --- |
| PlayGreeting | Offset | Number of seconds from the start. (optional) | Only on failure | Will result in a state transition to "PlayingGreeting" |
| | Type | Oof or Primary (optional) | | GreetingType parameter is ignored unless the calling party is the VM owner. |
| | | Result Parameters | | |
| RecordMessage | | Length (in seconds) TerminationReason (timeout, stopped, etc) | | Will result in a state transition to "RecordingMessage" |
| PlayMessage | Offset | Number of seconds from the start. (optional) | Only on failure | Will result in a state transition to "PlayingMessage" |
| Stop | | | | Will result in a state transition to "Ready". Any recording or playing will end. |
| Hello | Version | Supported protocol version. Value is 1 is defined in this document. Newer protocols must always be a superset of this protocol. | | Sent by voice mail server at the start of a session. Indicates it is in the "Ready" state. GreetingRecordLimit is not present unless the calling party if the VM box owner. |
| | MessageRecordLimit | Number of seconds allowed for recording a voice mail message | | |
| | GreetingRecordLimit | Number of seconds allowed in a greeting. | | |
| RecordGreeting | Type | Oof or Primary (optional) | Length (in seconds) of the resulting recording. Termination Reason (timeout, stopped, etc) | Will result in a state transition to "Recording Greeting" This command will fail unless the calling party is the VM box owner. |

TABLE 1-continued

| Command | Parameters | | Result | Notes |
|---|---|---|---|---|
| SetAttributes | Subject | New subject for the voicemail | Only on failure | Sets attributes to be included in the voicemail. This will overwrite any values initialized from the original INVITE. Delete attributes by supplying the parameter without a value. |

Each Voicemail control command, result, and event can be carried by SIP INFO request or response. While every INFO request with the content type "application/ms-vmcontrol+xml" can carry at least one voicemail control primitive, in general only some INFO responses can carry a primitive. Applications can check responses to INFO requests that carried voicemail control primitives to verify if the response also carries control primitives. Since a response typically should be sent immediately, it is not always feasible to include information, and to reduce the overall signaling, responses can be employed when feasible.

An exemplary call flow in accordance with an aspect of the subject innovation can include:

```
← Voicemail to Client (INFO Request)
<?xml version="1.0" encoding="UTF-8"?>
<command xmlns="<ms-rtc-vm-unique-namespace>" name="Hello">
    <param name="Version" value="1"/>
    <param name="MessageLimit" value="120"/>
</command>
    → Client to Voicemail (INFO Request)
<?xml version="1.0" encoding="UTF-8"?>
<command xmlns="<ms-rtc-vm-unique-namespace>"
name="PlayGreeting"/>
    ← Voicemail to Client (INFO Response)
<?xml version="1.0" encoding="UTF-8"?>
<event xmlns="<ms-rtc-vm-unique-namespace>" name="StateChange">
    <param name="state" value="PlayingGreeting"/>
</event>
```

The caller hears the greeting and the voicemail system transitions to "Ready" when the greeting is finished playing. The "Stop" command can also be employed to cause such transition sooner.

```
←Voicemail to Client (INFO Request)
<?xml version="1.0" encoding="UTF-8"?>
<event xmlns="<ms-rtc-vm-unique-namespace>" name="StateChange">
    <param name="state" value="Ready"/>
</event>
    →Client to Voicemail (INFO Request)
<?xml version="1.0" encoding="UTF-8"?>
<command xmlns="<ms-rtc-vm-unique-namespace>"
name=" SetAttributes">
    <param name="Subject" value="Microsoft VoIP is cool"/>
    <param name="Priority" value="High"/>
</command>
<?xml version="1.0" encoding="UTF-8"?>
<command xmlns="<ms-rtc-vm-unique-namespace>"
name="RecordMessage"/>
    ←Voicemail to Client (INFO Response)
<?xml version="1.0" encoding="UTF-8"?>
<event xmlns="<ms-rtc-vm-unique-namespace>" name="StateChange">
    <param name="state" value="RecordingMessage"/>
</event>
```

For example caller records, and does not need to be available for 120 seconds, so a Stop is sent.

```
    → Client to Voicemail (INFO Request)
<?xml version="1.0" encoding="UTF-8"?>
<command xmlns="<ms-rtc-vm-unique-namespace>" name="Stop"/>
    ← Voicemail to Client (INFO Request)
<?xml version="1.0" encoding="UTF-8"?>
<result xmlns="<ms-rtc-vm-unique-namespace>"
name="RecordMessage">
    <param name="length" value="24"/>
    <param name="TerminationReason" value="Stopped"/>
</result>
<event xmlns="<ms-rtc-vm-unique-namespace>" name="StateChange">
    <param name="state" value="Ready"/>
</event>
```

Caller wants to hear how his recording turned out:

```
    → Client to Voicemail (INFO Request)
<?xml version="1.0" encoding="UTF-8"?>
<command xmlns="<ms-rtc-vm-unique-namespace>"
name="PlayMessage"/>
    ← Voicemail to Client (INFO Response)
<?xml version="1.0" encoding="UTF-8"?>
<event xmlns="<ms-rtc-vm-unique-namespace>" name="StateChange">
    <param name="state" value="PlayingMessage"/>
</event>
```

For example, the caller can hear the recorded message being played back. When the end of the recording is reached, the state changed event arrives.

```
    ← Voicemail to Client (INFO Request)
<?xml version="1.0" encoding="UTF-8"?>
<event xmlns="<ms-rtc-vm-unique-namespace>" name="StateChange">
    <param name="state" value="Ready"/>
</event>
```

Upon completion the caller can hang up, an SIP BYE request being sent. Likewise, the voicemail server enters the "Finishing" state as it composes the email and sends it.

Figure 8:
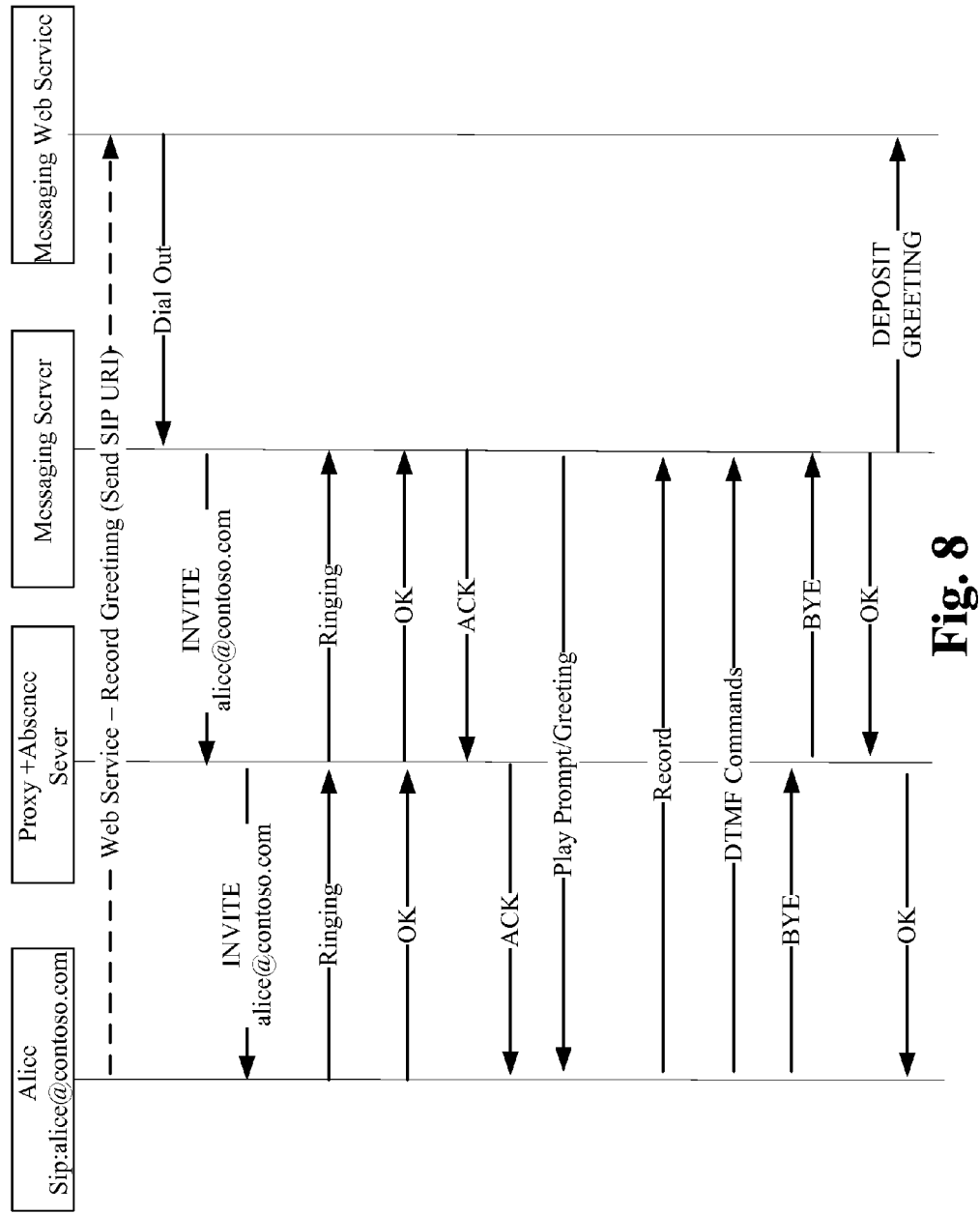
FIG. 8 illustrates a sequence of acts between users in accordance with an aspect of the subject innovation.

FIG. 8 illustrates a sequence of acts between users in accordance with an aspect of the subject innovation. Initially, a user (e.g., Alice, alice@contoso.com) opens the associated voice mail application of the subject innovation, and selects voicemail greetings. A connection can then be supplied to an associated messaging web service, wherein a communication of the user subsequently rings. The user can then pick up to hear an associated voicemail greeting recording, and further speak out the greetings.

The outgoing Invite from the messaging server can contain Session Initiation Protocol (SIP) Uniform Resource Identifier (URI), which can be formed out of the user's extension number and the fully qualified domain name (FQDN). For example, the following syntax can be employed;

```
INVITE Sip:alice@contoso.com SIP/2.0
From: Sip: 55222@um.Contoso.com
To: sip:alice@contoso.com
Content-Type: application/sdp
```

Figure 9:
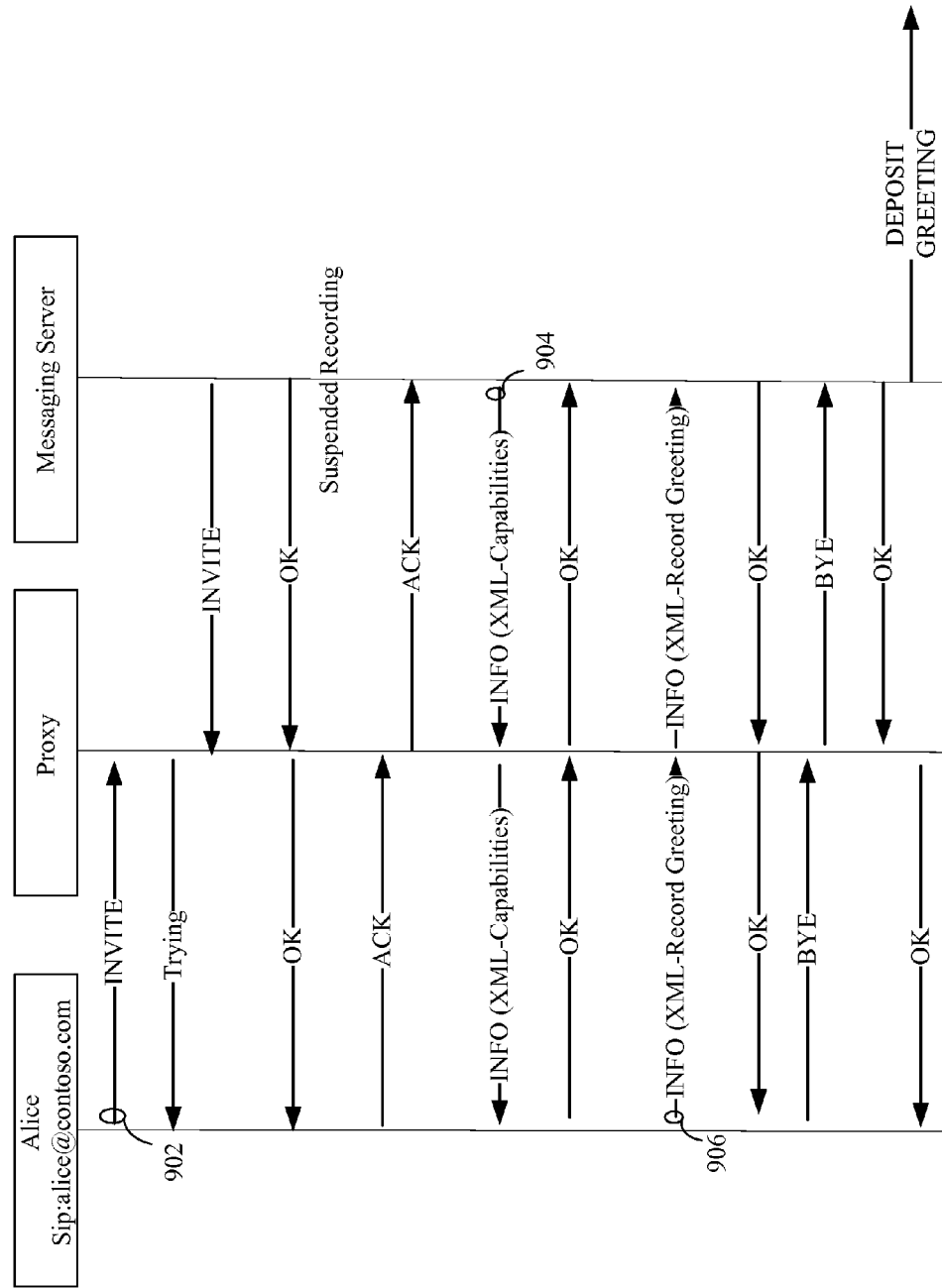
FIG. 9 illustrates an additional sequence of acts related to greeting records in accordance with an aspect of the subject innovation.

FIG. 9 illustrates a related sequence of acts related to greeting records in accordance with an aspect of the subject innovation. Such call flow covers how a user (e.g., Alice, alice@contoso.com) who can record one's own greeting from voice mail application, wherein the application has to dial into the voicemail server and provide it with a specific command to start the recording. Initially, the user can open the application and connect to the voice mail system, wherein the voicemail controls (e.g., record, play, and the like) are displayed to the user. The user can then select the Out of Office (OOF) voice message. The User can then record button and speak out the greeting, and then hang up.

For example, the original invite 902 can be addressed to alice@contoso.com, who is calling her own voice mailbox;

```
INVITE sip:alice@contoso.com;ms-app=voicemail SIP/2.0
From: Sip:alice@contoso.com
To: sip:alice@contoso.com
Accept : application/ms-vmcontrol+xml
Accept : application/sdp
Content-Type: application/sdp
```

Moreover, the INFO 904 is sent to server that instructs it to start recording greeting, for example;

```
INFO sip:23333@um.contoso.com SIP/2.0
From: Sip:alice@contoso.com
To: sip:alice@contoso.com
Content-Type :application/ms-vmcontrol+xml
Content-Length: 147
<?xml version="1.0" encoding="UTF-8"?>
<command xmlns="<ms-rtc-vm-unique-namespace>"
name="RecordGreeting">
    <param name="type" value="OOF"/>
</command>
```

Similarly, INFO 906 is sent to server that instructs it to start recording greeting

```
INFO sip:23333@um.contoso.com SIP/2.0
From: Sip:alice@contoso.com
To: sip:alice@contoso.com
Content-Type :application/ms-vmcontrol+xml
Content-Length: 147
<?xml version="1.0" encoding="UTF-8"?>
<command xmlns="<ms-rtc-vm-unique-namespace>"
name="CommitGreeting">
</command>
```

Figure 10:
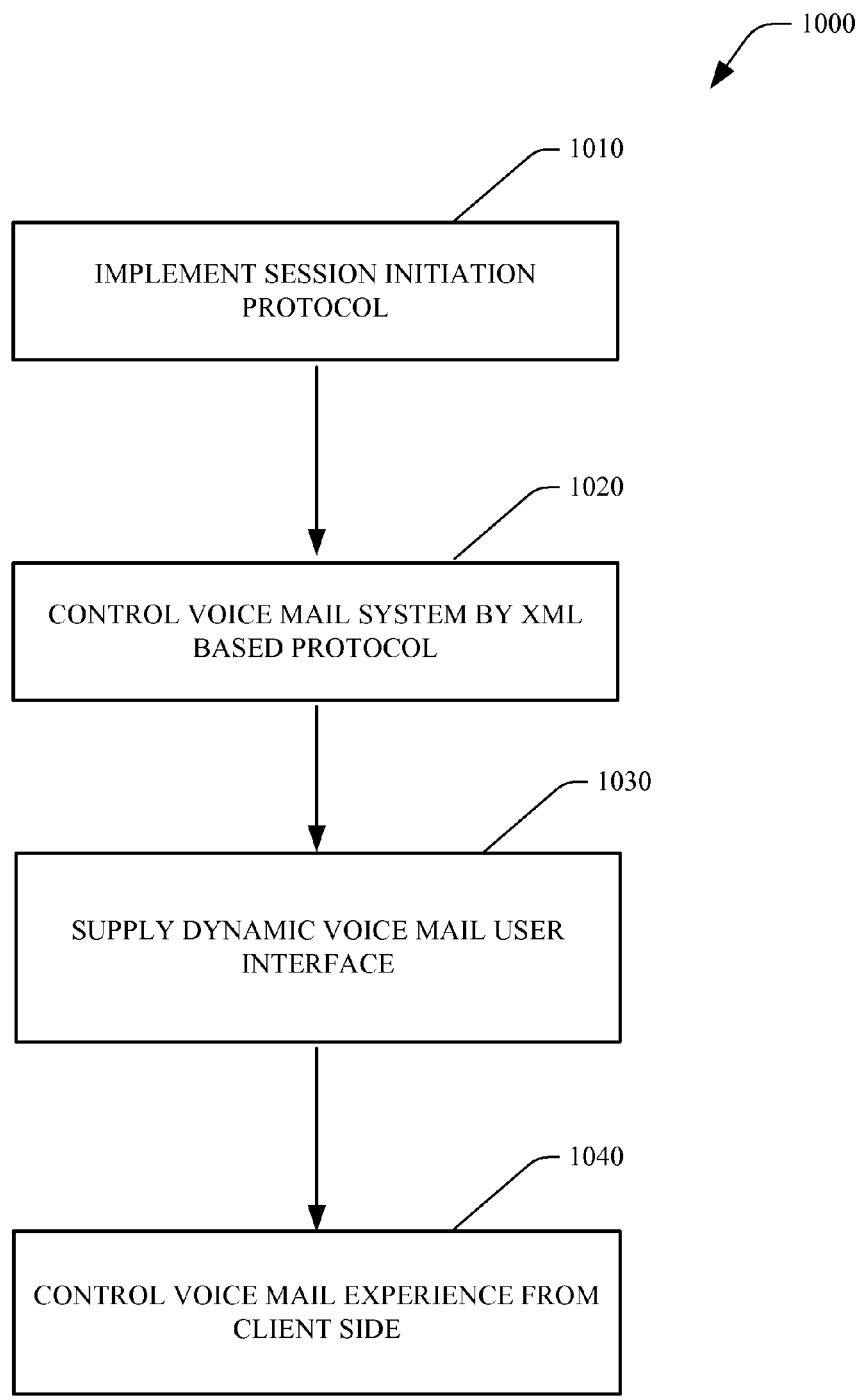
FIG. 10 illustrates a further methodology of controlling voice mail experience from a client side of a voice mail server system in accordance with an aspect of the subject innovation.

FIG. 10 illustrates a further methodology 1000 of controlling voice mail experience from a client side of a voice mail server system in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 1010 a Session Initiation Protocol is implemented to carry out voice mail control command, result and event for the communication system. Next, and at 1020 the voice mail system is controlled by the XML based protocol. Applications typically check responses to INFO requests, (wherein such requests carry voicemail control primitives) to verify if the response also carries control primitives. At 1030 the user can be supplied with a dynamic voice mail interface that can be changed based on what activities the user engages in. Accordingly, at 1040 the voice mail experience can be controlled from the client side.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 11:
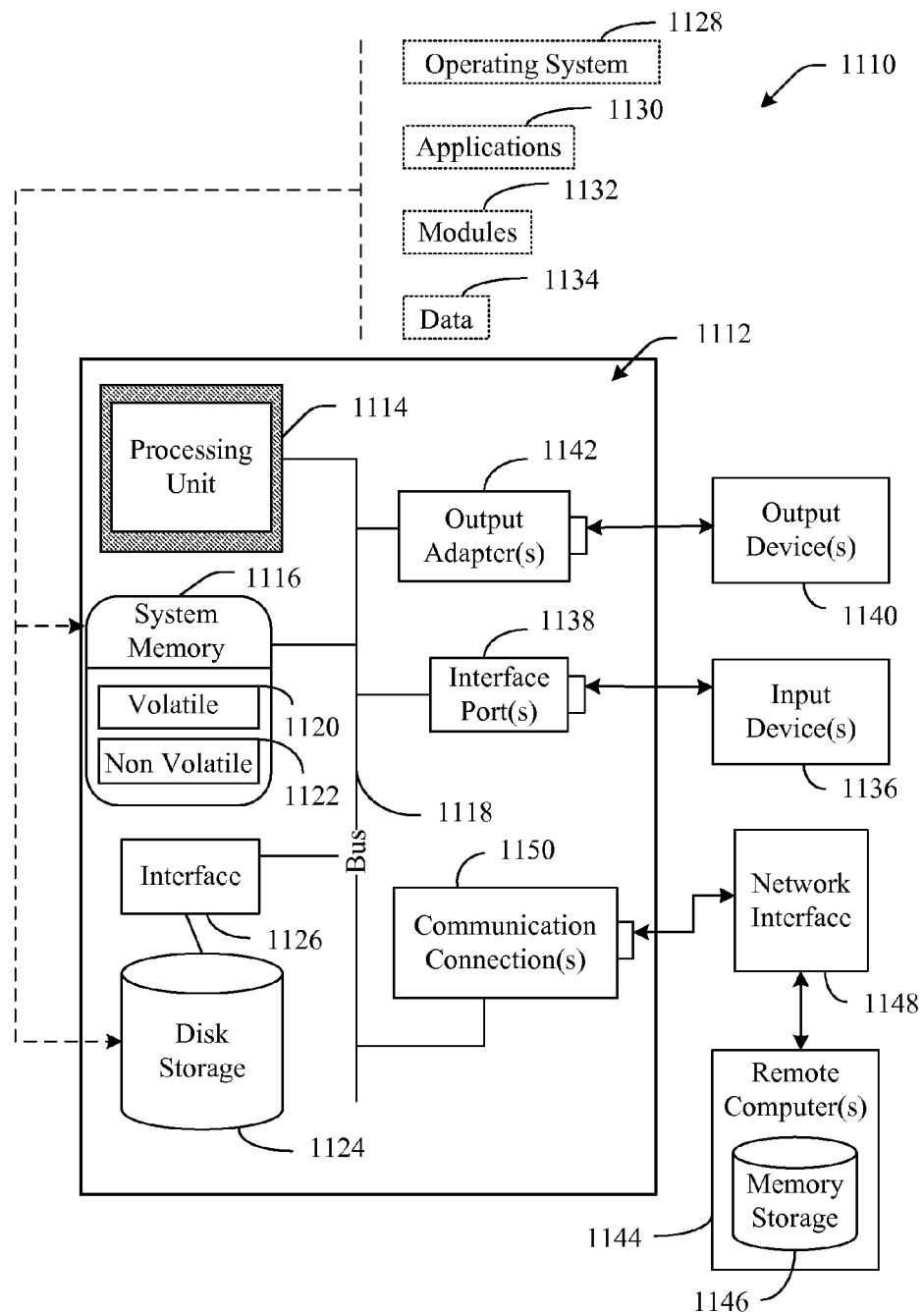
FIG. 11 illustrates an exemplary operating environment for implementing various aspects of the subject innovation.
Figure 12:
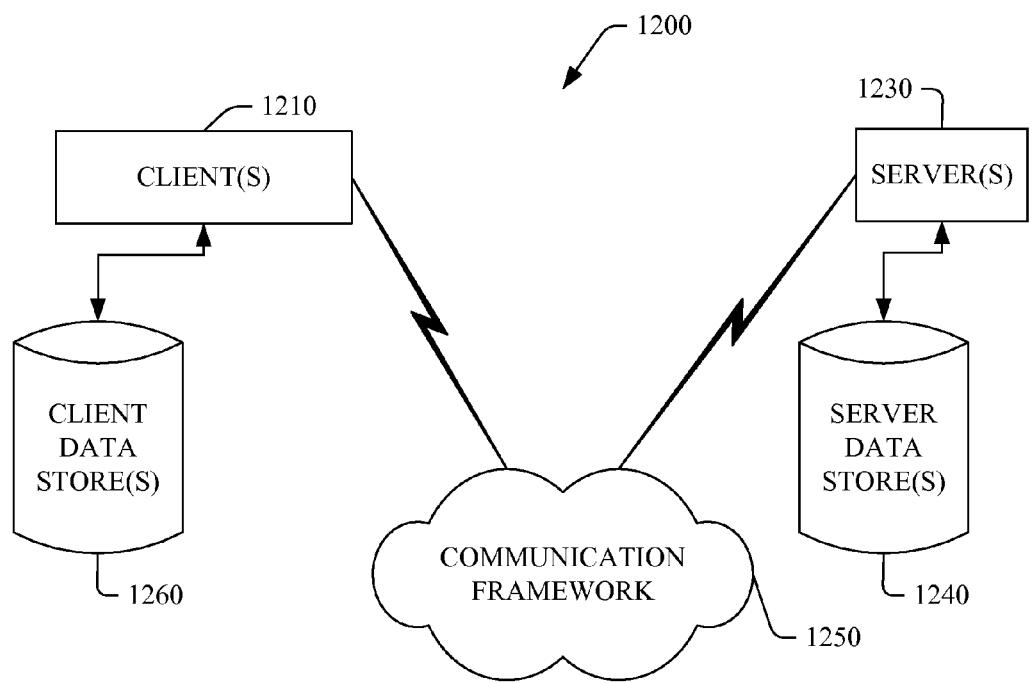
FIG. 12 illustrates a further schematic block diagram of a sample computing environment with which the subject innovation can interact.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, interfaces and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 11, an exemplary environment 1110 for implementing various aspects of the subject innovation is described that includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates a disk storage 1124, wherein such disk storage 1124 includes, but is not limited to, devices like a magnetic disk drive, floppy disk drive, tape drive, Jaz drive, Zip drive, LS-60 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that various components described herein can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 that can be employed in a voice messaging system of the subject innovation. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the components described herein, for example. One possible communication between a client 1210 and a server 1230 may be in the form of a data packet adapted to be transmitted between two or more computer processes. The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system comprising:
    a voice mail server system configured to provide a voice mail user interface and route a voice mail to an intended recipient via the voicemail user interface; and
    the voice mail server system being controlled at least partly via an XML protocol employing a Session Initiation Protocol (SIP) INFO request or response to carry out a voice mail control command causing a state transition of the voice mail server system that is reported in an event definition of the XML protocol, and having a success or failure reported according to a result definition of the XML protocol, the XML protocol being configured to employ parameters using a same syntax for the voice mail control command, the event definition and the result definition.

2. The computer implemented system of claim 1, the voice mail user interface including a field component configured to identify characteristics of the voice mail.

3. The computer implemented system of claim 1, further comprising an authorization component associated with the voice mail server system, configured to block depositing of voice messages.

4. The computer implemented system of claim 3, further comprising a control component configured to enable bypass of greetings associated with the voice mail server system.

5. The computer implemented system of claim 1, further comprising a client application configured to employ the XML protocol to control the voicemail system.

6. The computer implemented system of claim 1, further comprising an audio agent configured to evaluate at least one of tone of voice, volume or content of the voice mail.

7. The computer implemented system of claim 1, the voice mail user interface including a hang up button.

8. The computer implemented system of claim 1, the voice mail user interface including a flag button configured to flag the voice mail for follow up.

9. The computer implemented system of claim 7, the voice mail user interface including an importance button configured to set an importance of the voice mail.

10. The computer implemented system of claim 1, the voice mail user interface including an importance button configured to set an importance of the voice mail.

11. A computer implemented method comprising:
    supplying a voice mail user interface;
    carrying out a voice mail control command associated with the voice mail user interface via a session initiation protocol, the voice mail control command expressed in a syntax of an XML-based protocol;
    based on the voice mail control command, causing a state transition of a voice mail server system interacting with the voice mail user interface;
    reporting the state transition according to an event definition expressed in the syntax of the XML-based protocol;
    reporting a success or failure of the voice mail control command according to a result definition expressed in the syntax of the XML-based protocol; and
    employing at least one parameter using a same syntax for the voice mail control command, the event definition and the result definition.

12. The computer implemented method of claim 11, further comprising employing an audio agent to evaluate a content of a voice mail.

13. The computer implemented method of claim 12, further comprising employing the audio agent to evaluate a tone of voice or volume of the voice mail.

14. The computer implemented method of claim 11, further comprising checking responses to INFO requests of the session initiation protocol by associated applications to verify presence of voicemail control primitives.

15. The computer implemented method of claim 11, further comprising employing dual tone multi frequency, in a fall back scenario.

16. The computer implemented method of claim 11, further comprising roaming an active greeting.

17. The computer implemented method of claim 11, further comprising automatically setting an out of office greeting based on a change to an out of office state.

18. The computer implemented method of claim 11, further comprising sharing a voice mail greeting.

19. The computer implemented method of claim 11, further comprising defining characteristics of a voice mail.

20. A computer-readable storage device storing instructions executable by a computing device to perform operations comprising:
    executing a client voicemail application;
    presenting an interface that displays a plurality of options for call forwarding, the options including an option to have calls forwarded during specific times set via the interface, to a recipient set by the interface, and based on a location;
    in response to selection of an option, communicating a command in an XML syntax to a voice mail server by way of the client voice mail application, in the form of a Session Initiation Protocol (SIP) INFO request or response; and
    causing a state transition in the voice mail server by the command, the state transition being reported in an event definition of the XML syntax and having a success or failure reported according to a result definition of the XML syntax, the XML protocol being configured to employ parameters using a same syntax for the command, the event definition, and the result definition.

* * * * *